(12) United States Patent
Joshi et al.

(10) Patent No.: US 9,245,311 B2
(45) Date of Patent: Jan. 26, 2016

(54) DISPLAY APPARATUS ACTUATORS INCLUDING ANCHORED AND SUSPENDED SHUTTER ELECTRODES

(71) Applicant: Pixtronix, Inc., San Diego, CA (US)

(72) Inventors: Nikhil Jayant Joshi, Malden, MA (US); Joyce Wu, Somerville, MA (US)

(73) Assignee: Pixtronix, Inc., San Diego, CA (US)

( * ) Notice: Subject to any disclaimer, the term of this patent is extended or adjusted under 35 U.S.C. 154(b) by 0 days.

(21) Appl. No.: 14/452,258

(22) Filed: Aug. 5, 2014

(65) Prior Publication Data

US 2015/0185467 A1    Jul. 2, 2015

Related U.S. Application Data

(60) Provisional application No. 61/923,021, filed on Jan. 2, 2014.

(51) Int. Cl.
| | | |
|---|---|---|
| *G02B 26/08* | (2006.01) | |
| *G06T 1/60* | (2006.01) | |
| *H02N 1/00* | (2006.01) | |
| *G06T 1/20* | (2006.01) | |
| *G02B 26/02* | (2006.01) | |

(52) U.S. Cl.
CPC ............... *G06T 1/60* (2013.01); *G02B 26/023* (2013.01); *G06T 1/20* (2013.01); *H02N 1/008* (2013.01)

(58) Field of Classification Search
CPC ...... G02B 26/00; G02B 26/02; G02B 26/023; G02B 26/10; G02B 26/08; G02B 26/0841; G02B 26/0833; G02B 26/0858

USPC ............ 359/198.1, 223–226.1, 230, 290, 291
See application file for complete search history.

(56) References Cited

U.S. PATENT DOCUMENTS

| | | | |
|---|---|---|---|
| 7,129,617 B2 | 10/2006 | Hong et al. | |
| 7,616,368 B2 | 11/2009 | Hagood, IV et al. | |
| 7,969,637 B1 * | 6/2011 | Fu ...................... | G02B 26/0841 359/224.1 |
| 8,450,902 B2 | 5/2013 | Gulvin et al. | |
| 8,526,096 B2 | 9/2013 | Steyn et al. | |
| 2003/0183008 A1 | 10/2003 | Bang et al. | |
| 2007/0247018 A1 | 10/2007 | Flores et al. | |
| 2010/0110518 A1 | 5/2010 | Wu et al. | |

FOREIGN PATENT DOCUMENTS

WO    2006091791 A2    8/2006

OTHER PUBLICATIONS

International Search Report and Written Opinion—PCT/US2014/072853—ISA/EPO—Mar. 27, 2015.

* cited by examiner

*Primary Examiner* — Euncha Cherry
(74) *Attorney, Agent, or Firm* — Edward A. Gordon; Foley & Lardner LLP

(57) ABSTRACT

This disclosure provides systems, methods and apparatus for actuating an electromechanical systems (EMS)-based light modulator. An actuator for an EMS-based light modulator can be formed from the combination of a drive electrode, an anchored shutter electrode, and a suspended shutter electrode. A parallel plate portion of the drive electrode along with the suspended shutter electrode form a parallel plate portion of the actuator. A zipper portion of the drive electrode and the anchored shutter electrode form a zipper portion of the actuator.

30 Claims, 9 Drawing Sheets

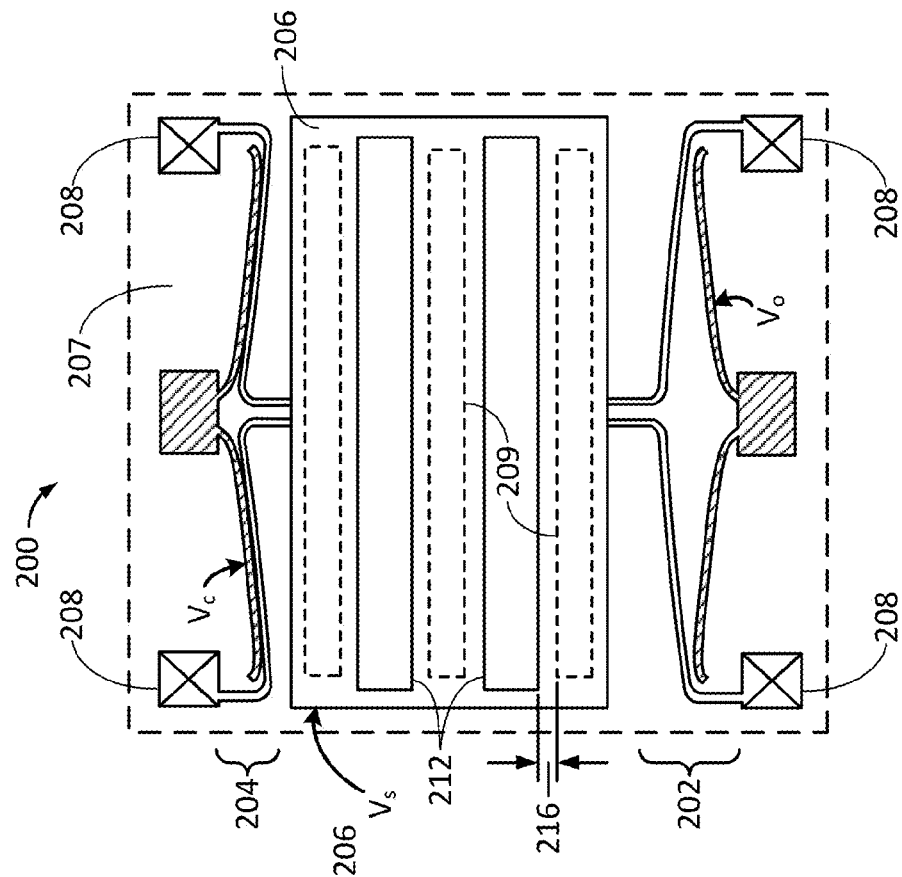
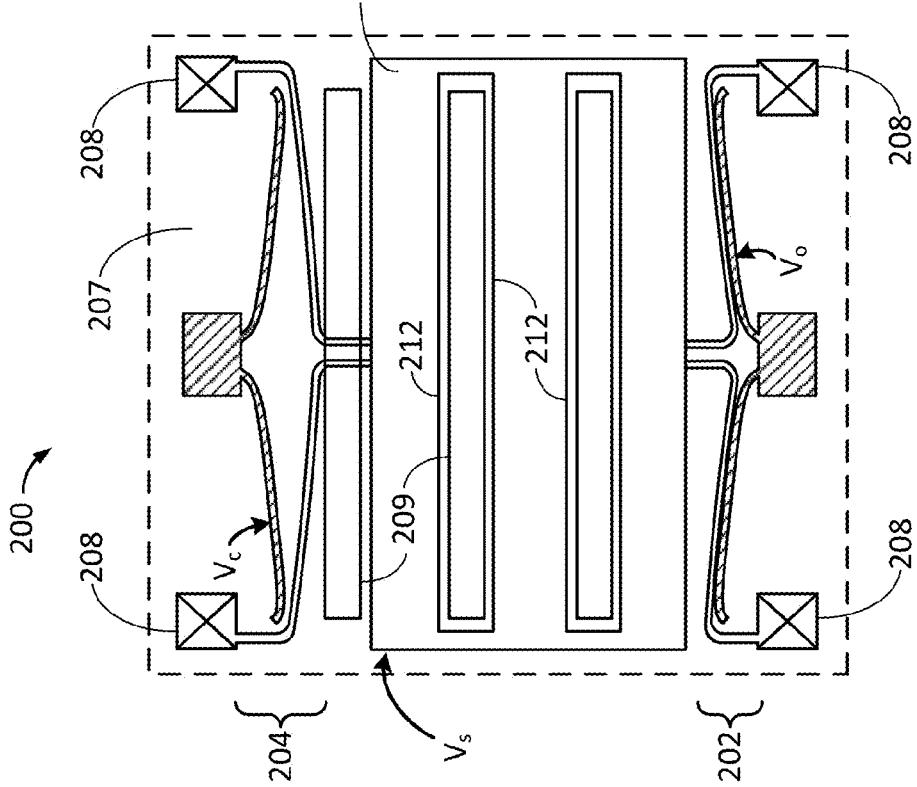

DISPLAY APPARATUS ACTUATORS INCLUDING ANCHORED AND SUSPENDED SHUTTER ELECTRODES

RELATED APPLICATIONS

The present application for patent claims priority to U.S. Provisional Patent Application No. 61/923,021, entitled "Display Apparatus Actuators Including Anchored And Suspended Load Electrodes," filed Jan. 2, 2014, and assigned to the assignee hereof and hereby expressly incorporated by reference herein.

TECHNICAL FIELD

This disclosure relates to the field of imaging displays, and in particular to actuators for setting the states of mechanical display elements.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

EMS-based display apparatus have been proposed that include display elements that modulate light by selectively moving a light blocking component into and out of an optical path through an aperture defined through a light blocking layer. Doing so selectively passes light from a backlight or reflects light from the ambient or a front light to form an image.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an electromechanical systems (EMS) shutter and an EMS actuator. The EMS actuator includes a drive electrode and a shutter electrode. The drive electrode includes a parallel plate portion and a zipper portion. The shutter electrode includes a parallel plate portion coupled to the shutter opposite the parallel plate portion of the drive electrode and a zipper portion. The zipper portion is coupled to the shutter adjacent to, and separated from, the parallel plate portion of the shutter electrode and positioned opposite to the zipper portion of the drive electrode.

In some implementations, the parallel plate portion of the shutter electrode includes a portion that is substantially parallel to the parallel plate portion of the drive electrode. In some implementations, the parallel plate portion of the shutter electrode includes a suspended shutter electrode, and the zipper portion of the shutter electrode includes an anchored shutter electrode.

In some implementations, the drive electrode forms a loop. In some implementations, the loop of the drive electrode includes a front portion adjacent the shutter electrode and a rear portion behind the first portion with respect to the shutter electrode, and the apparatus further includes a drive electrode anchor coupling to the rear portion of the drive electrode loop away from either end of the loop. In some implementations, the parallel plate portion of the drive electrode is substantially parallel to an edge of the shutter closest to the drive electrode, and the zipper portion of the drive electrode extends out from the parallel plate portion of the drive electrode at an angle towards the edge of the shutter. In some implementations, the drive electrode and the zipper portion of the shutter electrode are substantially mechanically compliant and the parallel plate portion of the shutter electrode is substantially less compliant than the zipper portion of the shutter electrode.

In some implementations, the shutter further includes a first edge running substantially normal to an axis of motion of the shutter. The parallel plate portion and the zipper portion of the shutter electrode extend out towards the drive electrode from the first edge. In some implementations, the parallel plate portion of the shutter electrode forms a loop including a portion that is substantially parallel to the first edge of the shutter. In some implementations, one end of the parallel plate portion of the shutter electrode couples to the first edge at about a distance away from a first end of the first edge that is between about 8% and about 25% of the distance between the first end of the first edge and a second end of the first edge. In some implementations, one end of the parallel plate portion of the shutter electrode couples to the first edge and a second end of the parallel plate portion of the shutter electrode couples to a second edge of the shutter. In some implementations, the second edge is an edge adjacent to the first edge. In some other implementations, the second edge is an edge opposite the first edge.

In some implementations, the apparatus also includes a display including the EMS shutter as a light modulator, a processor capable of communicating with the display and processing image data, and a memory device capable of communicating with the processor. In some implementations, the apparatus also includes a driver circuit capable of sending at least one signal to the display and a controller capable of sending at least a portion of the image data to the driver circuit. In some implementations, the apparatus includes an image source module capable of sending the image data to the processor, and the image source module includes at least one of a receiver, transceiver, and transmitter.

Another innovative aspect of the subject matter described in this disclosure can be implemented as an apparatus including an EMS shutter having a first edge running substantially normal to a direction of motion of the shutter and an EMS actuator. The EMS actuator includes an anchored shutter electrode, a suspended shutter electrode, and a drive electrode. The anchored shutter electrode is coupled at one end to the first edge of the shutter at a first connection point spaced away from a first corner of the first edge and at a second end to a first anchor supporting the shutter over a substrate. The anchored shutter electrode includes a portion that extends out from the first connection point and then alongside the shutter to at least about a second corner of the first edge of the shutter. The suspended shutter electrode couples to the shutter between the first connection point and the first corner. The drive electrode is coupled to a second anchor positioned proximate to the first corner of the shutter, and includes a first portion that extends substantially the entire length of the first edge of the shutter adjacent the anchored shutter electrode and the suspended shutter electrode. In some implementations, the drive electrode and the anchored shutter electrode are substantially compliant.

In some implementations, the suspended shutter electrode forms a loop, including one end that couples to the shutter at a second connection point along the first edge between the first connection point and the first corner and a second end that couples adjacent the first corner. In some implementations, the second connection point is spaced away from the first corner by a distance equal to between about 8% and about 25% of the distance between the first corner and the second corner.

In some implementations, the drive electrode includes a second portion, positioned behind the first portion with respect to the anchored shutter electrode, coupling each end of the first portion of the drive electrode to the second anchor. In some implementations, the second portion of the drive electrode extends away from the second anchor both in the direction of the first anchor and in an opposite direction towards the first corner of the shutter.

In some implementations, the drive electrode includes a parallel plate portion which is substantially parallel with, and adjacent to, the suspended shutter electrode. In some such implementations, one end of the parallel plate portion of the drive electrode extends away from the second anchor towards the first corner of the shutter.

Another innovative aspect of the subject matter described in this disclosure can be implemented as an apparatus including a mass and a drive electrode. The mass has a mass zipper electrode coupled to the mass and a mass parallel plate electrode coupled to the mass. The drive electrode includes a drive zipper electrode portion that is positioned opposite to the mass zipper electrode, and a drive parallel plate electrode portion that is substantially opposite to the mass parallel plate electrode.

In some implementations, the mass zipper electrode and the mass parallel plate electrode couple to the mass along a common edge of the mass. In some implementations, the drive electrode extends substantially the entire length of the common edge of the mass. In some implementations, the mass zipper electrode couples to the common edge of the mass at a distance from a corner of the common edge equal to between about 8% and about 25% of the total length of the common edge. In some implementations, the mass parallel plate electrode defines a loop. In some implementations, the mass includes a microelectromechanical systems (MEMS) shutter.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 2A and 2B show views of an example dual actuator shutter assembly.

Like reference numbers and designations in the various drawings indicate like elements.

DETAILED DESCRIPTION

Figure 1A:
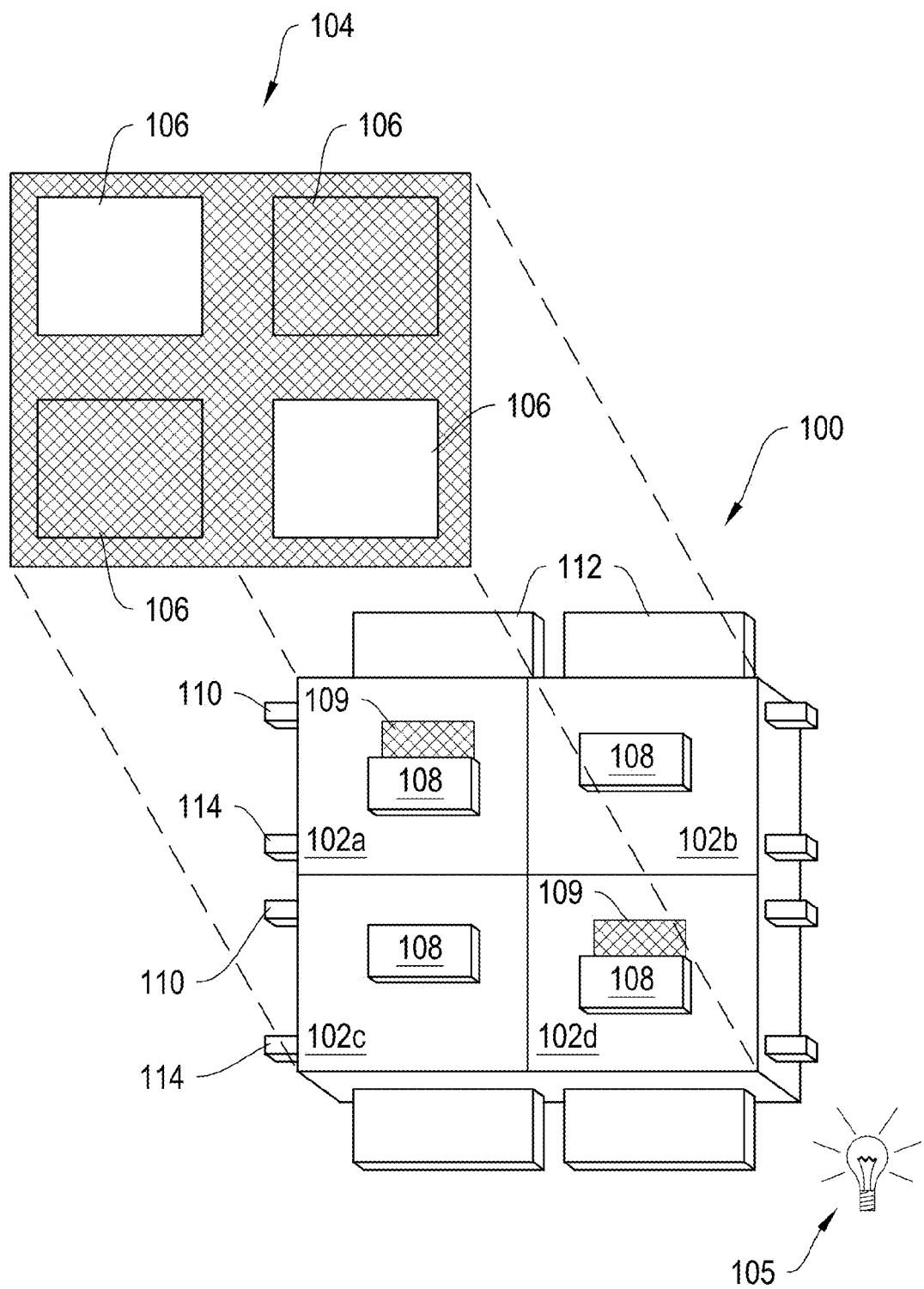
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that is capable of displaying an image, whether in motion (such as video) or stationary (such as still images), and whether textual, graphical or pictorial. The concepts and examples provided in this disclosure may be applicable to a variety of displays, such as liquid crystal displays (LCDs), organic light-emitting diode (OLED) displays, field emission displays, and electromechanical systems (EMS) and microelectromechanical (MEMS)-based displays, in addition to displays incorporating features from one or more display technologies.

The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An actuator for a shutter-based light modulator can be formed from the combination of a drive electrode, an anchored shutter electrode, and a suspended shutter electrode. The suspended shutter electrode extends out from a shutter towards the drive electrode and is located towards one end of an edge of the shutter that is adjacent the actuator. The anchored shutter electrode is positioned adjacent the suspended shutter electrode along the same edge of the shutter and couples to an anchor positioned towards the opposite end of that shutter edge.

The actuator can be viewed as including two functional portions, a zipper actuation portion and a parallel plate actuation portion. The parallel plate portion of the actuator is formed by the suspended shutter electrode and a parallel plate portion of the drive electrode, which is substantially parallel to the surface of the suspended shutter electrode closest to the drive electrode. The zipper portion of the actuator includes the anchored shutter electrode and a portion of the drive electrode that extends out from the parallel plate portion of the drive electrode at an angle towards the shutter.

During actuation, the zipper portion of the actuator initiates the actuation and provides the primary actuation force for the initial stages of actuation. As the actuation continues, the parallel plate portion of the actuator contributes increased actuation force facilitating full actuation of the actuator.

Particular implementations of the subject matter described in this disclosure can be implemented to realize one or more of the following potential advantages. The combination of a zipper actuation portion and a parallel plate portion into a single electrostatic actuator yields an actuator with improved performance. In addition, a shutter electrode that includes both a shorter anchored shutter electrode (i.e., one which does not extend the full length of a shutter) and a suspended shutter electrode provides high out-of-plane (of the shutter plane) stiffness, preventing tilting or other out-of-plane motion of a shutter attached to the anchored shutter electrode, while still providing for complete actuation at lower actuation voltages.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the image can be seen by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent substrates to facilitate a sandwich assembly arrangement where one substrate, containing the light modulators, is positioned over the backlight. In some implementations, the transparent substrate can be a glass substrate (sometimes referred to as a glass plate or panel), or a plastic substrate. The glass substrate may be or include, for example, a borosilicate glass, wine glass, fused silica, a soda lime glass, quartz, artificial quartz, Pyrex, or other suitable glass material.

Each light modulator 102 can include a shutter 108 and an aperture 109. To illuminate a pixel 106 in the image 104, the shutter 108 is positioned such that it allows light to pass through the aperture 109. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix coupled to the substrate and to the light modulators for controlling the movement of the shutters. The control matrix includes a series of electrical interconnects (such as interconnects 110, 112 and 114), including at least one write-enable interconnect 110 (also referred to as a scan line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate drive voltages, which are typically higher in magnitude than the data voltages, to the light modulators 102. The application of these drive voltages results in the electrostatic driven movement of the shutters 108.

The control matrix also may include, without limitation, circuitry, such as a transistor and a capacitor associated with each shutter assembly. In some implementations, the gate of each transistor can be electrically connected to a scan line interconnect. In some implementations, the source of each transistor can be electrically connected to a corresponding data interconnect. In some implementations, the drain of each transistor may be electrically connected in parallel to an electrode of a corresponding capacitor and to an electrode of a corresponding actuator. In some implementations, the other electrode of the capacitor and the actuator associated with each shutter assembly may be connected to a common or ground potential. In some other implementations, the transistor can be replaced with a semiconducting diode, or a metal-insulator-metal switching element.

Figure 1B:
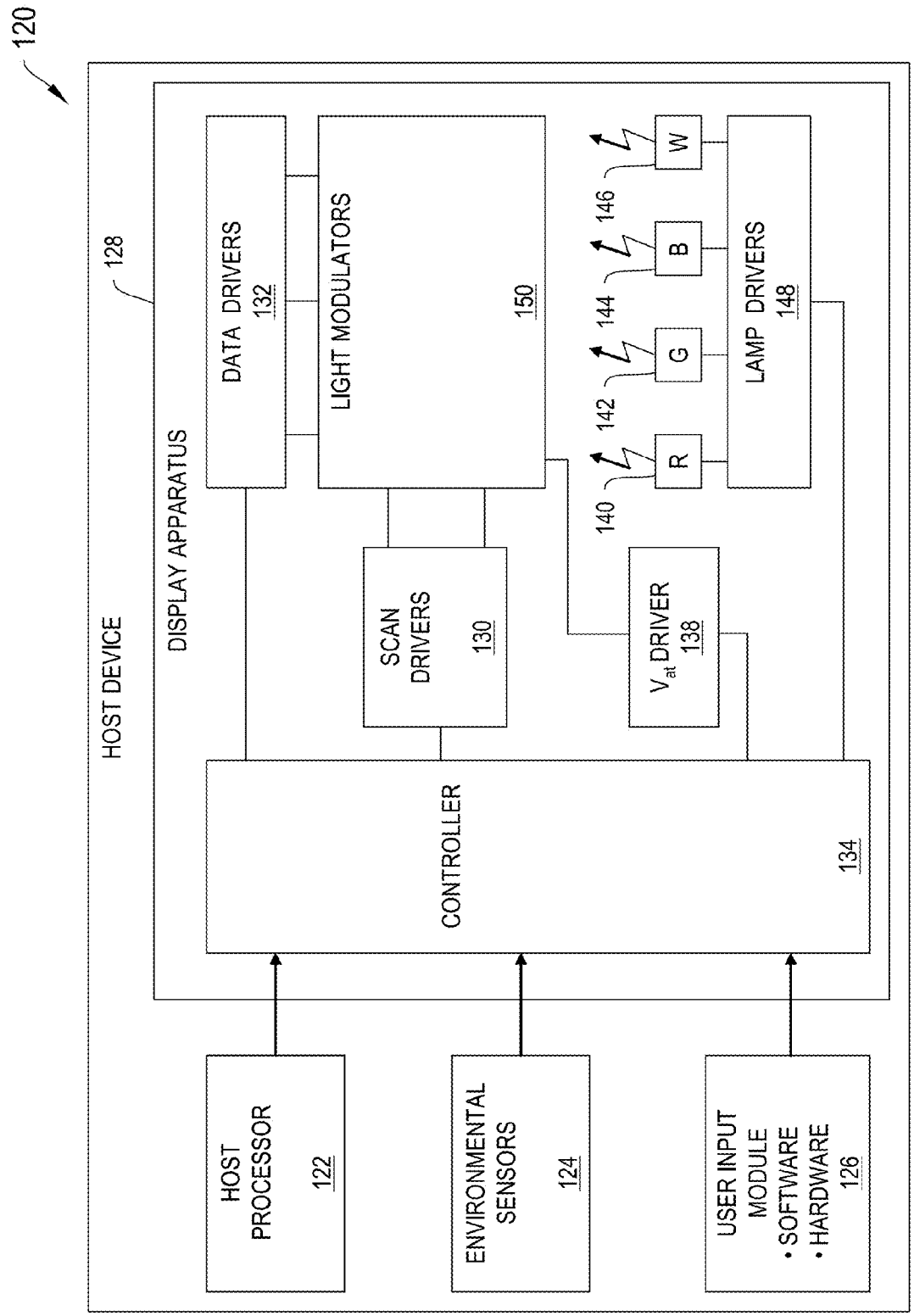
FIG. 1B shows a block diagram of an example host device.

FIG. 1B shows a block diagram of an example host device 120 (i.e., cell phone, smart phone, PDA, MP3 player, tablet, e-reader, netbook, notebook, watch, wearable device, laptop, television, or other electronic device). The host device 120 includes a display apparatus 128 (such as the display apparatus 100 shown in FIG. 1A), a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array of display elements 150, such as the light modulators 102 shown in FIG. 1A. The scan drivers 130 apply write enabling voltages to scan line interconnects 131. The data drivers 132 apply data voltages to the data interconnects 133.

In some implementations of the display apparatus, the data drivers 132 are capable of providing analog data voltages to the array of display elements 150, especially where the luminance level of the image is to be derived in analog fashion. In analog operation, the display elements are designed such that when a range of intermediate voltages is applied through the data interconnects 133, there results a range of intermediate illumination states or luminance levels in the resulting image. In some other implementations, the data drivers 132 are capable of applying only a reduced set, such as 2, 3 or 4, of digital voltage levels to the data interconnects 133. In implementations in which the display elements are shutter-based light modulators, such as the light modulators 102 shown in FIG. 1A, these voltage levels are designed to set, in digital fashion, an open state, a closed state, or other discrete state to each of the shutters 108. In some implementations, the drivers are capable of switching between analog and digital modes.

The scan drivers 130 and the data drivers 132 are connected to a digital controller circuit 134 (also referred to as the controller 134). The controller 134 sends data to the data drivers 132 in a mostly serial fashion, organized in sequences, which in some implementations may be predetermined, grouped by rows and by image frames. The data drivers 132 can include series-to-parallel data converters, level-shifting, and for some applications digital-to-analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 139. In some other implementations, the common drivers 138, following commands from the controller 134, issue voltage pulses or signals to the array of display elements 150, for instance global actuation pulses which are capable of driving and/or initiating simultaneous actuation of all display elements in multiple rows and columns of the array.

Each of the drivers (such as scan drivers 130, data drivers 132 and common drivers 138) for different display functions can be time-synchronized by the controller 134. Timing commands from the controller 134 coordinate the illumination of red, green, blue and white lamps (140, 142, 144 and 146 respectively) via lamp drivers 148, the write-enabling and sequencing of specific rows within the array of display elements 150, the output of voltages from the data drivers 132, and the output of voltages that provide for display element actuation. In some implementations, the lamps are light emitting diodes (LEDs).

The controller 134 determines the sequencing or addressing scheme by which each of the display elements can be re-set to the illumination levels appropriate to a new image 104. New images 104 can be set at periodic intervals. For instance, for video displays, color images or frames of video are refreshed at frequencies ranging from 10 to 300 Hertz (Hz). In some implementations, the setting of an image frame to the array of display elements 150 is synchronized with the illumination of the lamps 140, 142, 144 and 146 such that alternate image frames are illuminated with an alternating series of colors, such as red, green, blue and white. The image frames for each respective color are referred to as color sub-frames. In this method, referred to as the field sequential color method, if the color subframes are alternated at frequencies in excess of 20 Hz, the human visual system (HVS) will average the alternating frame images into the perception of an image having a broad and continuous range of colors. In some other implementations, the lamps can employ primary colors other than red, green, blue and white. In some implementations, fewer than four, or more than four lamps with primary colors can be employed in the display apparatus 128.

In some implementations, where the display apparatus 128 is designed for the digital switching of shutters, such as the shutters 108 shown in FIG. 1A, between open and closed states, the controller 134 forms an image by the method of time division gray scale. In some other implementations, the display apparatus 128 can provide gray scale through the use of multiple display elements per pixel.

In some implementations, the data for an image state is loaded by the controller 134 to the array of display elements 150 by a sequential addressing of individual rows, also referred to as scan lines. For each row or scan line in the sequence, the scan driver 130 applies a write-enable voltage to the write enable interconnect 131 for that row of the array of display elements 150, and subsequently the data driver 132 supplies data voltages, corresponding to desired shutter states, for each column in the selected row of the array. This addressing process can repeat until data has been loaded for all rows in the array of display elements 150. In some implementations, the sequence of selected rows for data loading is linear, proceeding from top to bottom in the array of display elements 150. In some other implementations, the sequence of selected rows is pseudo-randomized, in order to mitigate potential visual artifacts. And in some other implementations, the sequencing is organized by blocks, where, for a block, the data for only a certain fraction of the image is loaded to the array of display elements 150. For example, the sequence can be implemented to address only every fifth row of the array of the display elements 150 in sequence.

In some implementations, the addressing process for loading image data to the array of display elements 150 is separated in time from the process of actuating the display elements. In such an implementation, the array of display elements 150 may include data memory elements for each display element, and the control matrix may include a global actuation interconnect for carrying trigger signals, from the common driver 138, to initiate simultaneous actuation of the display elements according to data stored in the memory elements.

In some implementations, the array of display elements 150 and the control matrix that controls the display elements may be arranged in configurations other than rectangular rows and columns. For example, the display elements can be arranged in hexagonal arrays or curvilinear rows and columns.

The host processor 122 generally controls the operations of the host device 120. For example, the host processor 122 may be a general or special purpose processor for controlling a portable electronic device. With respect to the display apparatus 128, included within the host device 120, the host processor 122 outputs image data as well as additional data about the host device 120. Such information may include data from environmental sensors 124, such as ambient light or temperature; information about the host device 120, including, for example, an operating mode of the host or the amount of power remaining in the host device's power source; information about the content of the image data; information about the type of image data; and/or instructions for the display apparatus 128 for use in selecting an imaging mode.

In some implementations, the user input module 126 enables the conveyance of personal preferences of a user to the controller 134, either directly, or via the host processor 122. In some implementations, the user input module 126 is controlled by software in which a user inputs personal preferences, for example, color, contrast, power, brightness, content, and other display settings and parameters preferences. In some other implementations, the user input module 126 is controlled by hardware in which a user inputs personal preferences. In some implementations, the user may input these preferences via voice commands, one or more buttons, switches or dials, or with touch-capability. The plurality of data inputs to the controller 134 direct the controller to provide data to the various drivers 130, 132, 138 and 148 which correspond to optimal imaging characteristics.

The environmental sensor module 124 also can be included as part of the host device 120. The environmental sensor module 124 can be capable of receiving data about the ambient environment, such as temperature and/or ambient lighting conditions. The sensor module 124 can be programmed, for example, to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. The shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Each of the actuators 202 and 204 can be implemented as compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. Having the actuators 202 and 204 attach to opposing ends of the shutter 206 along its axis of movement reduces out of plane motion of the shutter 206 and confines the motion substantially to a plane parallel to the substrate (not depicted).

In the depicted implementation, the shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B, the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In some implementations, in which circular, elliptical, oval, or other curved apertures are formed in the aperture layer 207, each aperture may have only a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through the apertures 212 and 209 in the open state, the width or size of the shutter apertures 212 can be designed to be larger than a corresponding width or size of apertures 209 in the aperture layer 207. In order to effectively block light from escaping in the closed state, the light blocking portions of the shutter 206 can be designed to overlap the edges of the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators, there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 3A:
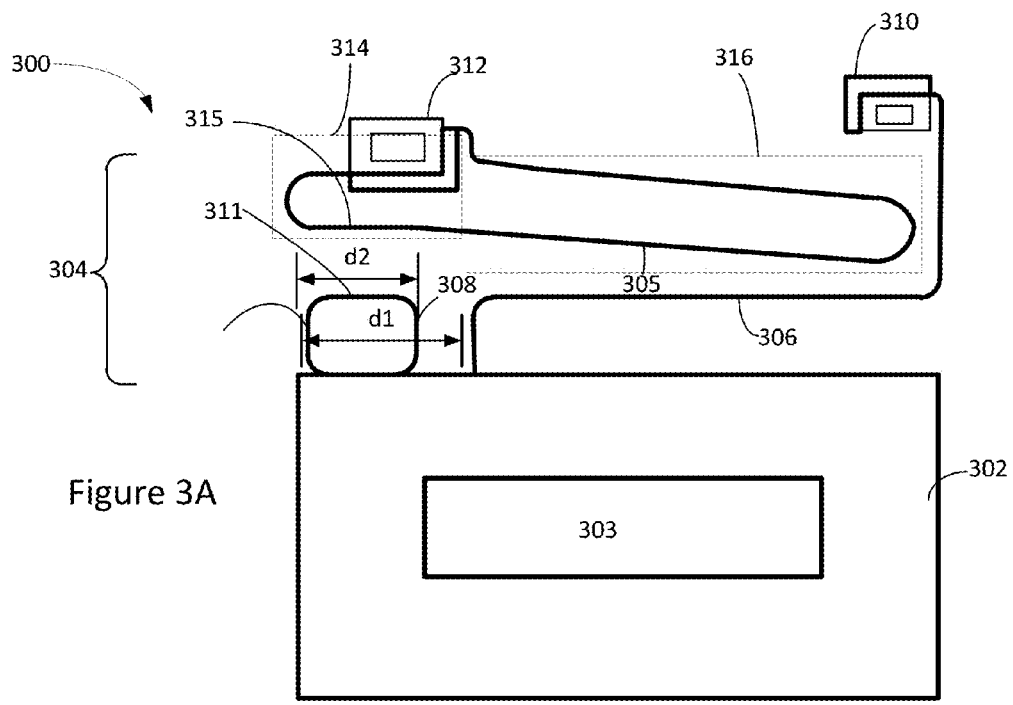
FIGS. 3A-3D show top view of an EMS light modulator in various stages of actuation.
Figure 3B:
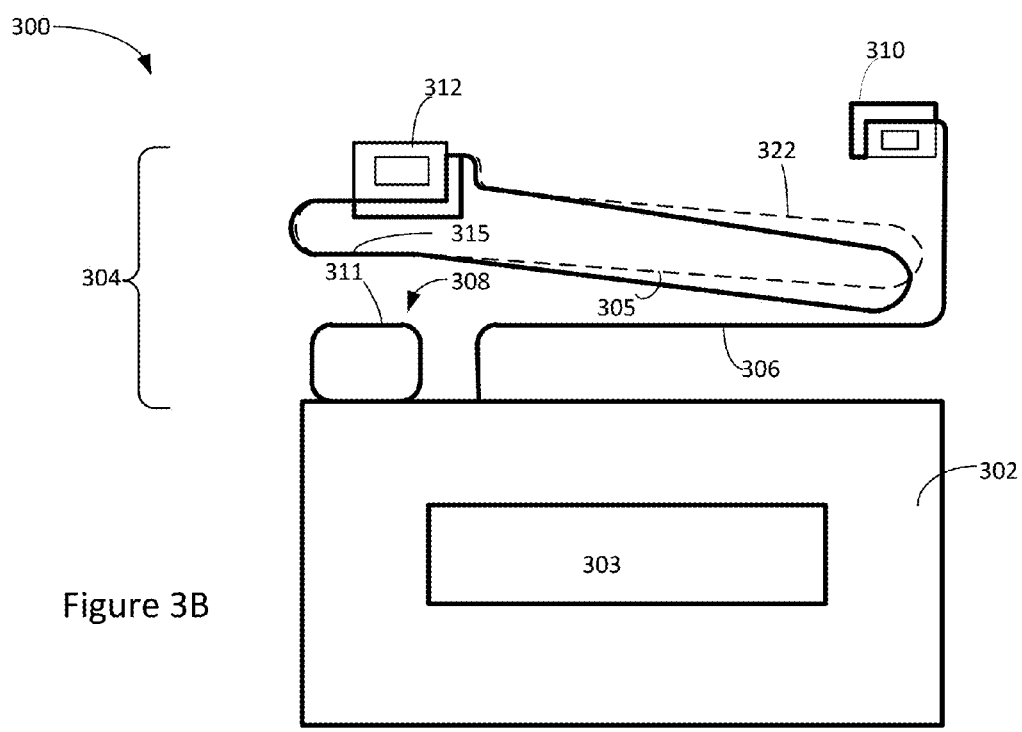
Figure 3C:
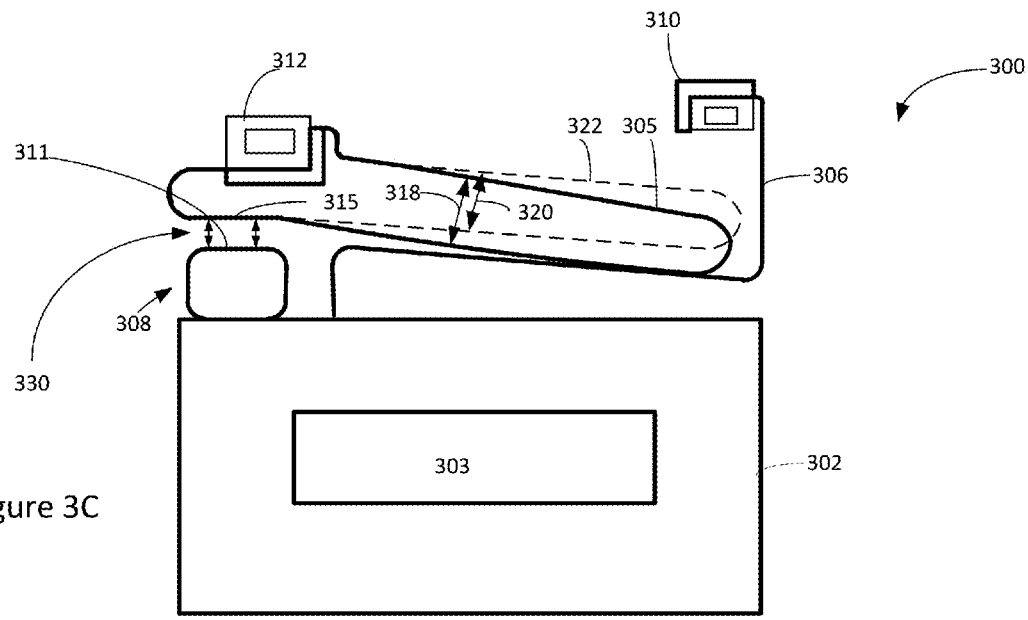
Figure 3D:
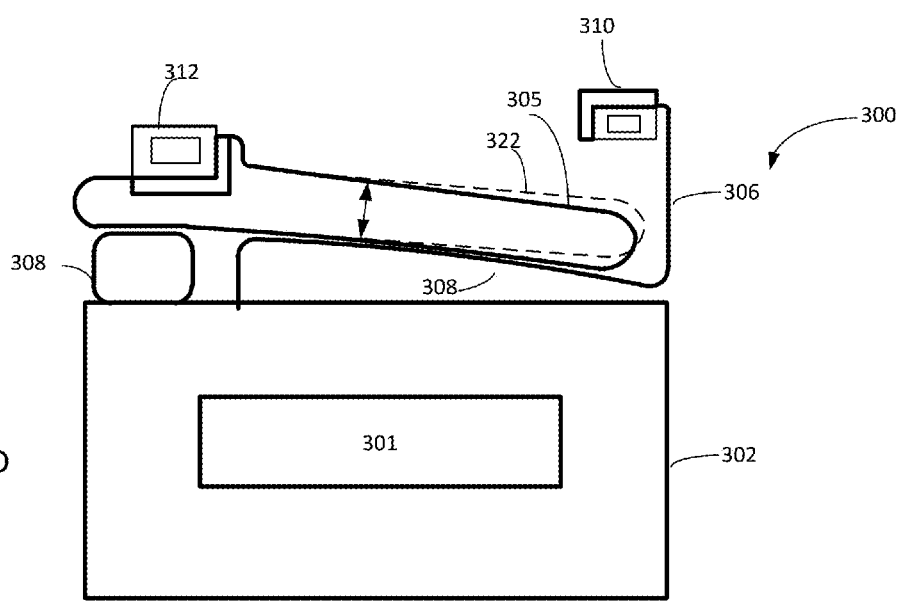

FIGS. 3A-3D show top views of an EMS light modulator 300 in various stages of actuation. The EMS light modulator 300 is similar to the shutter assembly 200 shown in FIGS. 2A and 2B. FIG. 3A shows the EMS light modulator 300 in a rest state. FIGS. 3B and 3C show the EMS light modulator 300 in two intermediate stags of actuation, while FIG. 3D shows the EMS light modulator 300 in a fully actuated state.

The EMS light modulator 300 includes a shutter 302 and an electrostatic actuator 304 (the actuator 304) configured to move the shutter 302 substantially in a plane parallel to the plane of the shutter 302. In some implementations, the shutter ranges from about 60 to about 120 microns long (i.e., in a direction perpendicular to the direction of movement of the shutter) by between about 40 microns and about 80 microns wide (along the direction of shutter movement). The shutter includes an aperture 303 defined through its surface. The aperture, in some implementations, is between about 8 microns and about 20 microns wide and about 40 and about 100 microns long.

The actuator 304 includes a single drive electrode 305 adjacent to an anchored shutter electrode 306 and a suspended shutter electrode 308. The anchored shutter electrode 306 and the suspended shutter electrode 308 can alternatively be referred to as "load electrodes" because they couple to the mechanical load (i.e., the shutter) moved by the actuator 304. The anchored shutter electrode 306 and the suspended shutter electrode 308 are positioned adjacent to one another along one edge of the shutter 302. The drive electrode 305 extends adjacent the two shutter electrodes 306 and 308 along substantially the entire length of the edge of the shutter 302, such that the portions of the drive electrode 305 are positioned opposite both the majority of the anchored shutter electrode 306 and opposite the suspended shutter electrode 308.

As shown in FIG. 3A, the anchored shutter electrode 306 couples to the shutter at a distance d1 away from a corner of the shutter 302. The distance d1 is between 10% and about 75% of the total length of the shutter (normal to the axis of movement of the shutter 302, which runs from top to bottom on the page). The anchored shutter electrode then extends away from the shutter (e.g., for a distance equal to between about 5% and about 15% of the length of the shutter 302 or, in some implementations about 5 microns to about 15 microns), at an angle to, and in some implementations normal to, the edge of the shutter to which it couples, and then extends substantially parallel to that edge to about the far corner of the shutter 302. At about the corner of the shutter, the anchored shutter electrode 306 turns again away from the shutter until it couples with a first anchor 310. As such the total length of the anchored shutter electrode ranges, in various implementations, from about 60 to about 120 microns. The portion of the anchored shutter electrode 306 that runs substantially parallel to the edge of the shutter 302 has increased mechanical compliance, facilitating the zipper actuation of the actuator 304, described further below. As such, the anchored shutter electrode 306 can be referred to as a zipper portion of a combined shutter electrode that includes both anchored shutter electrode 306 and the suspended shutter electrode 308.

Figure 4:
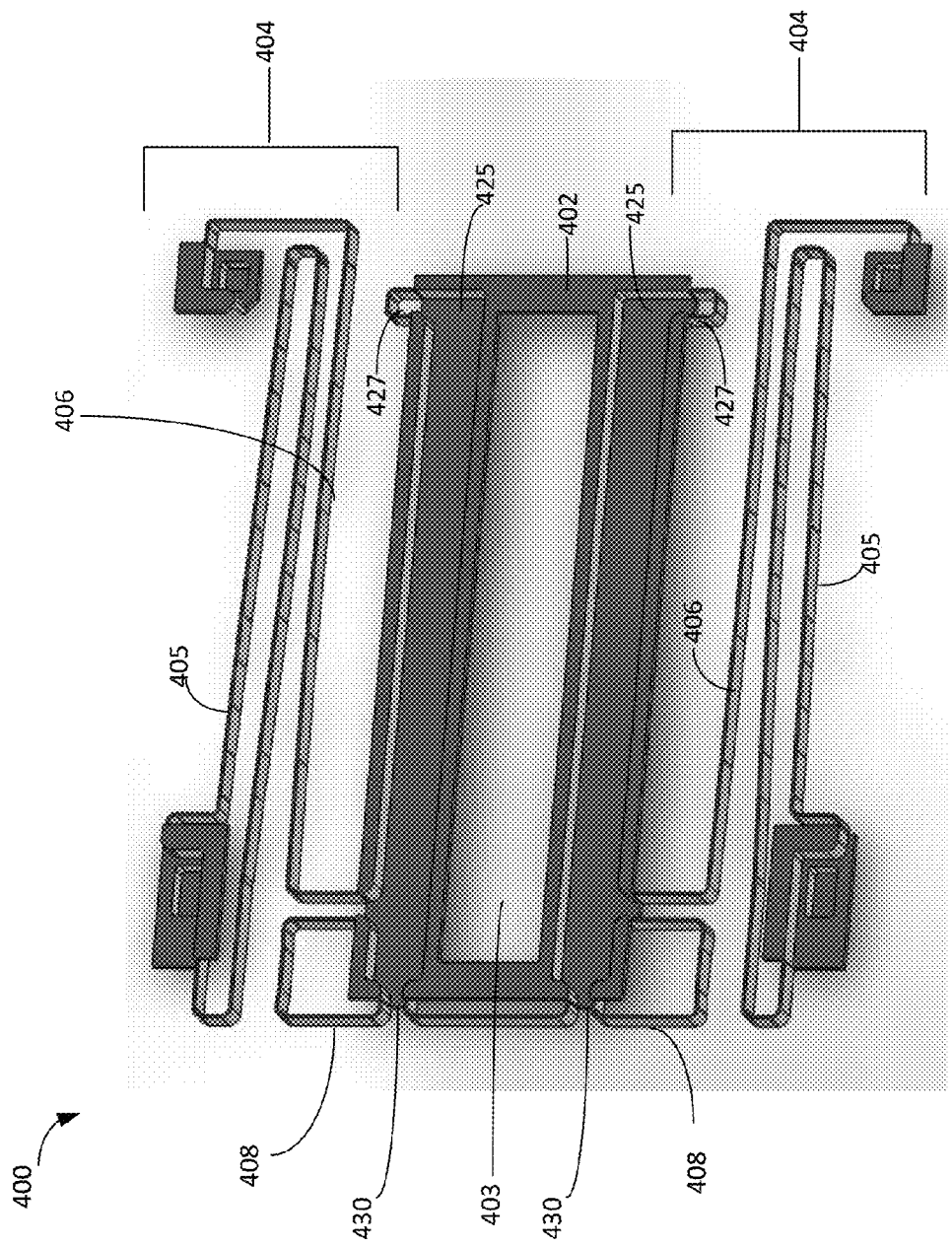
FIG. 4 shows an isometric view of another EMS light modulator.

The suspended shutter electrode 308 is positioned on the edge of the shutter 302 between where the anchored shutter electrode 306 couples to the shutter 302 and the nearest corner of the shutter. It couples at one end to the shutter a second distance d2 from the corner. The distance d2 can be between about 8% and about 25% of the full length of the shutter 302. As shown in FIGS. 3A-3D, the other end of the suspended shutter electrode 308 couples to same edge of the shutter 302 proximate the nearest corner of the shutter, forming a loop. In some other implementations, as shown in FIG. 4, described further below, the suspended shutter electrode couples to the adjacent side of the shutter 302, also proximate the nearest corner. The suspended shutter electrode 308 extends about the same distance away from the shutter as the anchored shutter electrode 306, before the anchored shutter electrode 306 turns to run alongside the edge of the shutter 302. In some implementations, a parallel plate portion 311 of the suspended shutter electrode 308 is configured to run substantially parallel to the edge of the shutter 302, serving as a plate of a parallel plate electrostatic actuator incorporated into the actuator 304.

The drive electrode 305 couples to a second anchor 312. The drive electrode 305 extends away from two sides of the second anchor 312, forming an elongated loop. The drive electrode 305 can be described with respect to two portions of the loop, a short loop portion 314 and a long loop portion 316.

The short loop portion 314 extends away from the second anchor towards the corner of the shutter 302 proximate to the suspended shutter electrode 308. The short loop 314 then curves around towards the shutter until it runs substantially parallel to the parallel plate portion 311 of the suspended shutter electrode 308, forming an opposing plate of what amounts generally to a parallel plate actuator. As such, this portion of the drive electrode 305 can be referred to as a parallel plate portion 315 of the drive electrode. This parallel plate portion 315 of the short loop 314, being relatively close to a bend in the electrode is relatively rigid in comparison to other portions of the drive electrode 305. The long loop portion 316 extends away from the second anchor towards the first anchor 310, until it reaches about the end of the shutter 302, at which point it bends around before extending back along the length of the shutter to where it meets the short loop portion 314 of the drive electrode 305. In some implementations, there is a visible change in the shape or angle of the drive electrode 305 where the short loop portion 314 meets the long loop portion 316. In some other implementations, the distinction is not physically distinct, as the change in angle may be gradual. In such implementations, the short loop portion 314 can be considered to end when it is no longer opposite the suspended shutter electrode 308. The long loop portion 316 of the drive electrode 305, due to its length, has a great deal of compliance, particularly at points along the long loop portion that are about midway between the distal end of the long loop portion 316 and the closest portions of the short loop portion 314. This compliance aids in the zipper actuation of the actuator 304, as described further below. As such the portion of the long loop portion 316 adjacent the anchored shutter electrode 306 can be referred to as a zipper portion of the drive electrode 305.

The shutter 302, drive electrode 305, anchored shutter electrode 306, suspended shutter electrode, 308, and the first and second anchors 310 and 312 can all be fabricated in an integrated process from the same materials. For example, in some implementations, a multi-level mold made of sacrificial material, such as a photodefinable resin, is formed using photolithography. The mold includes surfaces that are parallel to the primary plane of the mold, and sidewalls that are normal to the primary plane of the mold. After the mold is defined, one or more layers of structural material, such as metals or semiconductors, are deposited over the mold in one or more conformal deposition processes, including, e.g., sputtering, physical vapor deposition (PVD), electroplating, chemical vapor deposition (CVD), plasma-enhanced chemical vapor deposition (PECVD), or atomic level deposition (ALD). Specific examples of suitable materials include, without limitation, amorphous silicon (a-Si), titanium (Ti), and aluminum (Al). The structural materials are then etched using one or more etch processes. In some implementations, an anisotropic etch is used to remove undesired portions of the structural material deposited on surfaces of the mold that are parallel to the primary plane of the mold, while leaving structural material on the sidewalls. This material on the sidewalls forms the drive electrode 305 and the two shutter electrodes 306 and 308. It also forms the vertical surfaces of the anchors 310 and 312. In some implementations, an additional etch step can be applied to remove one or more layers of material from the electrodes 305, 306, and 308, reducing their thickness and increasing their mechanical compliance. In some implementations, the electrodes 305, 306 and 308 range from about 0.5 microns to about 1.5 microns thick, and are between about 2 and about 10 microns high. The mold is then removed through a release process, freeing the remaining components to move.

FIGS. 3B-3D show the actuation of the actuator 304 of the EMS light modulator 300 shown in FIG. 3A. The actuation can be divided conceptually into a substantially zipper-based actuation phase shown in FIGS. 3B and 3C and a substantially parallel plate-based actuation phase shown in FIG. 3C, though both phases may involve both types of actuation to different degrees. FIG. 3D shows the EMS light modulator 300 when actuation is complete.

To actuate the actuator 304, a voltage differential (e.g., between less than about 10V and about 35V) is applied between the anchored and suspended shutter electrodes 306 and 308 and the drive electrode 305. The voltage differential is created by applying different voltages to the first and second anchors 310 and 312. A first voltage applied to the first anchor brings the anchored shutter electrode 306, the shutter 302, and the suspended shutter electrode 308 to that first voltage. A second voltage applied to the second anchor 312 brings the drive electrode 305 to the second voltage. The voltage differential results in an electric field and an electrostatic force between electrode 305 and each of electrodes 306 and 308. The magnitude of the force is inversely proportional to the square of the distance between electrodes. As such, at the initial stages of actuation, the greatest force is located between the distal end of long loop portion 316 of the drive electrode and its closest adjacent point on the anchored shutter electrode 306. Therefore, the initial stages of actuation are dominated by zipper actuation.

FIGS. 3B and 3C show top view of the zipper-based actuation phase of the actuator 304. The force between the shutter electrodes 306 and 308 and the drive electrode 305 is at the distal end of the drive electrode 305 where the electrodes are closest. As the portion of the anchored shutter electrode 306 adjacent the distal end of the drive electrode 305 is proximate to a bend in the anchored shutter electrode 306, it is substantially unable to deform to any meaningful degree towards the drive electrode. However, the distal end of the drive electrode 305 can and does deform towards the anchored shutter electrode, as is shown in FIG. 3B. The initial position 322 of the drive electrode 305 in each of Figures in 3B-3D is shown in broken lines for the sake of illustration.

As the distal end of the drive electrode 305 comes into contact with the anchored shutter electrode 306, actuation continues by the deformation of both the anchored shutter electrode towards the drive electrode and vice versa. As portions of the two electrodes 305 and 306 are drawn progressively closer together, the electrostatic force between them increases, further propagating the actuation along the length of the electrodes 305 and 306. To facilitate this "zipping" together of the drive electrode 305 and the anchored shutter electrode 306, the portion of the long loop portion 316 of the drive electrode 305 closest to anchored shutter electrode 306, due to its mechanical compliance, is able to expand and bow outwards toward the shutter electrode. The results of this stage of actuation are shown in FIG. 3C. The bowing out of a portion of the long loop portion of the drive electrode 305 can be seen by comparing the length of the arrows 318 connecting front and rear portions of the long loop portion 316 of the drive electrode 305 with the length of the adjacent arrow 320, connecting equivalent positions on the initial drive beam 322 (state shown in broken lines).

FIG. 3C also shows the beginnings of the parallel plate-based actuation phase. As also can be seen in FIG. 3C, even when substantially the entire length of the anchored shutter electrode 306 is drawn into contact with the long loop portion 316 of the drive electrode, the actuator 304 is still not fully actuated. This lack of full actuation could be resolved by extending the anchored shutter electrode substantially the entire length of the shutter 302. For example, the anchored shutter electrode 306 could couple to the shutter 302 at or near the corner of the shutter 302 closest to the second anchor 312 (either on the edge of the shutter that is substantially normal to the direction of motion of the shutter or on the edge of the shutter that is substantially parallel to the direction of motion of the shutter), instead of having it couple to the shutter 302 spaced away from the corner of the shutter, as shown in FIGS. 3A-3D. That configuration, however, has been found to lead to the shutter 302 having lower out-of-plane stiffness, resulting in the shutter tilting out-of-plane and having increased out-of-plane shutter 302 motion.

Instead, to provide additional force to complete the actuation of the actuator 304, the suspended shutter electrode 308 is added to fill the space between the point on the edge of the shutter 302 where the anchored shutter electrode couples to it and the corner of the shutter 302. The suspended shutter electrode 308 and the parallel plate portion 315 of the drive electrode 305 together form a parallel plate electrostatic actuator. The voltage differential across the gap between the parallel plate portion 311 and the suspended shutter electrode 308 results in an additional force 330, which increases the closer the two electrodes come to one another, completing the actuation of the actuator 304 during the parallel plate-based actuation phase. In some implementations, the distal end of the parallel plate portion 311 of the drive electrode 305 can bend towards the suspended shutter electrode 308, thereby reducing the distance between the electrodes and increasing the attractive force. That is, despite its increased stiffness, the parallel plate portion 311 of the drive electrode 305 may still provide some degree of zipper action, which helps the shutter fully actuate. FIG. 3D shows the shutter completely actuated.

When the actuation voltage is removed, the spring tension in the anchored shutter electrode restores the shutter 302 to its original position.

FIG. 4 shows an isometric view of another EMS light modulator 400. The EMS light modulator 400 is similar to the EMS light modulator 300 shown in FIG. 3. However, the EMS light modulator includes two actuators 404, one on either end of a shutter 402. Each actuator 404 includes a drive electrode 405, an anchored shutter electrode 406, and a suspended shutter electrode 408. In contrast to the suspended shutter electrode 308 shown in FIGS. 3A-3D, the suspended shutter electrodes 408 couple at one end to the same edge of the shutter 402 that the anchored shutter electrode 406 couples, and at the other end, they couple to the adjacent edge of the shutter 402. In addition, the upper surface of the shutter 402 is not planar as shown in FIGS. 3A-3D. Instead, the shutter 402 includes depressions 425 on either side of a central aperture 403. The depressions, also referred to as ribs increase the rigidity of the shutter 402, preventing bending or warping of the shutter 402. The shutter 402 also includes a pair of bumpers 427. The bumpers 427 are formed by loops extending off the same edges of the shutter 402 from which the suspended shutter electrodes 408 extend, but adjacent the corners at the opposite end of the shutter 402 from where the suspended shutter electrodes 408 couple to the shutter. The bumpers 427 help ensure the shutter 402 maintains an appropriate orientation throughout the actuation of the shutter 402, and helps prevent the leading edge of the shutter 402 from getting too close to the anchored shutter electrode 406, on which it might otherwise potentially get stuck.

Figure 5:
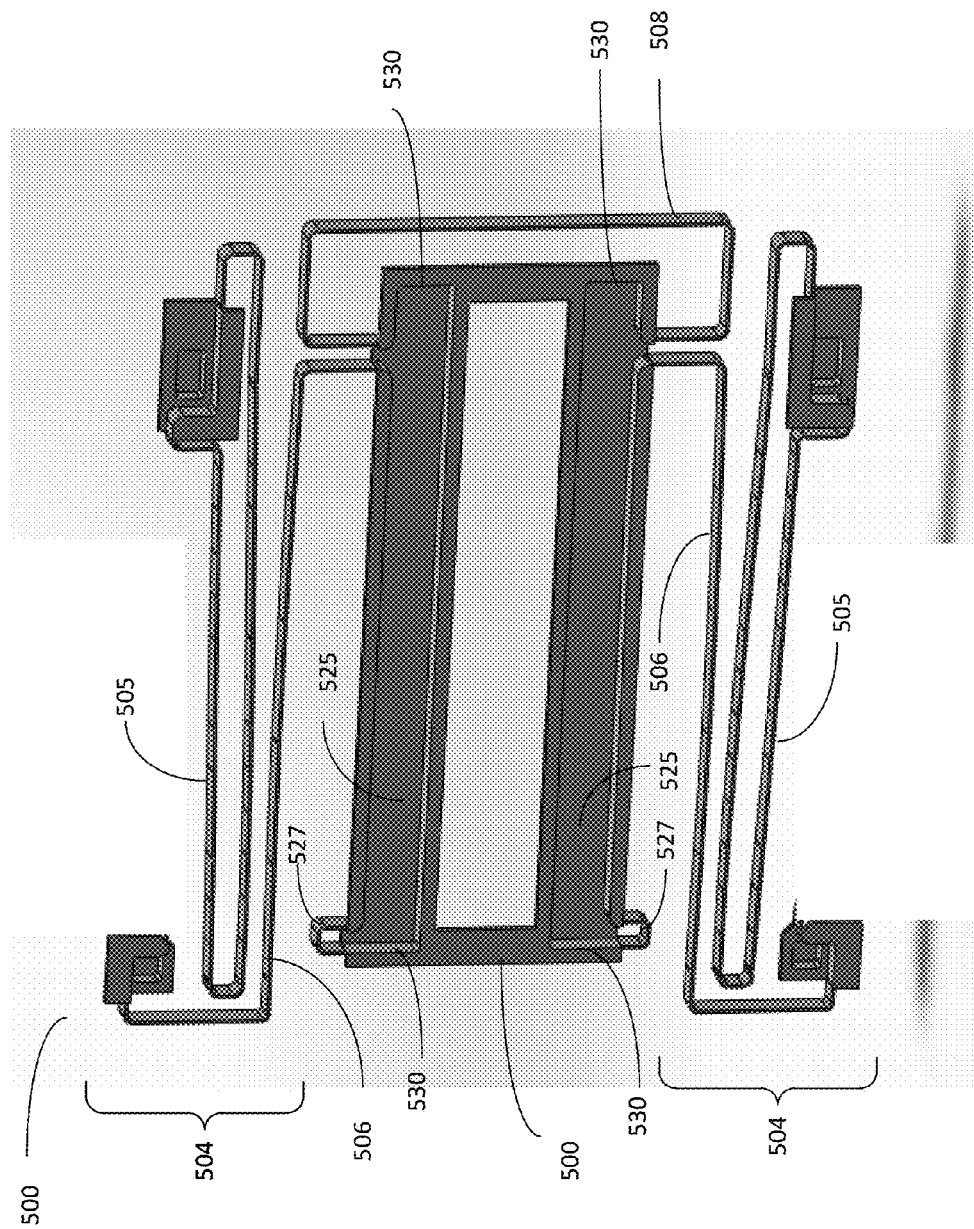
FIG. 5 shows an isometric view of another EMS light modulator.

FIG. 5 shows an isometric view of another EMS light modulator 500. The EMS light modulator 500 is similar to the EMS light modulator 400 shown in FIG. 4. The EMS light modulator 500 includes two actuators 504 on either end of a shutter 502. Each actuator 504 includes a drive electrode 505, an anchored shutter electrode 506, and a suspended shutter electrode 508. However, the actuators 504 of the EMS light modulator 500 includes an alternative suspended shutter electrode design. Instead of including two separate suspended shutter electrodes 408 as shown in FIG. 4, the actuators 504 of EMS light modulator 500 shown in FIG. 5 include a single shared suspended shutter electrode 508. In addition, like the EMS light modulator 400, the EMS light modulator 500 includes bumpers 527 extending from the edges of the shutter 502 adjacent the actuators 504 and depressions 525 in the surface of its shutter 502. However, the inclusion of the shared suspended shutter electrode 508 allows the EMS light modulator 500 to include a different configuration for its depressions 525. More particularly, both ends 530 of the depressions 525 along their long axis are continuous and do not include any gaps. In contrast, one end of each of the depressions 425 in the shutter 402 shown in FIG. 4 includes a gap 430. During operation, such gaps 430 can allow light entering the depressions 425 to reflect out and potentially reach a viewer, decreasing the contrast ratio of a display incorporating the EMS light modulator 400. The closed ends 530 of the depressions 525 prevent such light leakage, improving the contrast ratio of a display incorporating the EMS light modulator 500.

Figure 6:
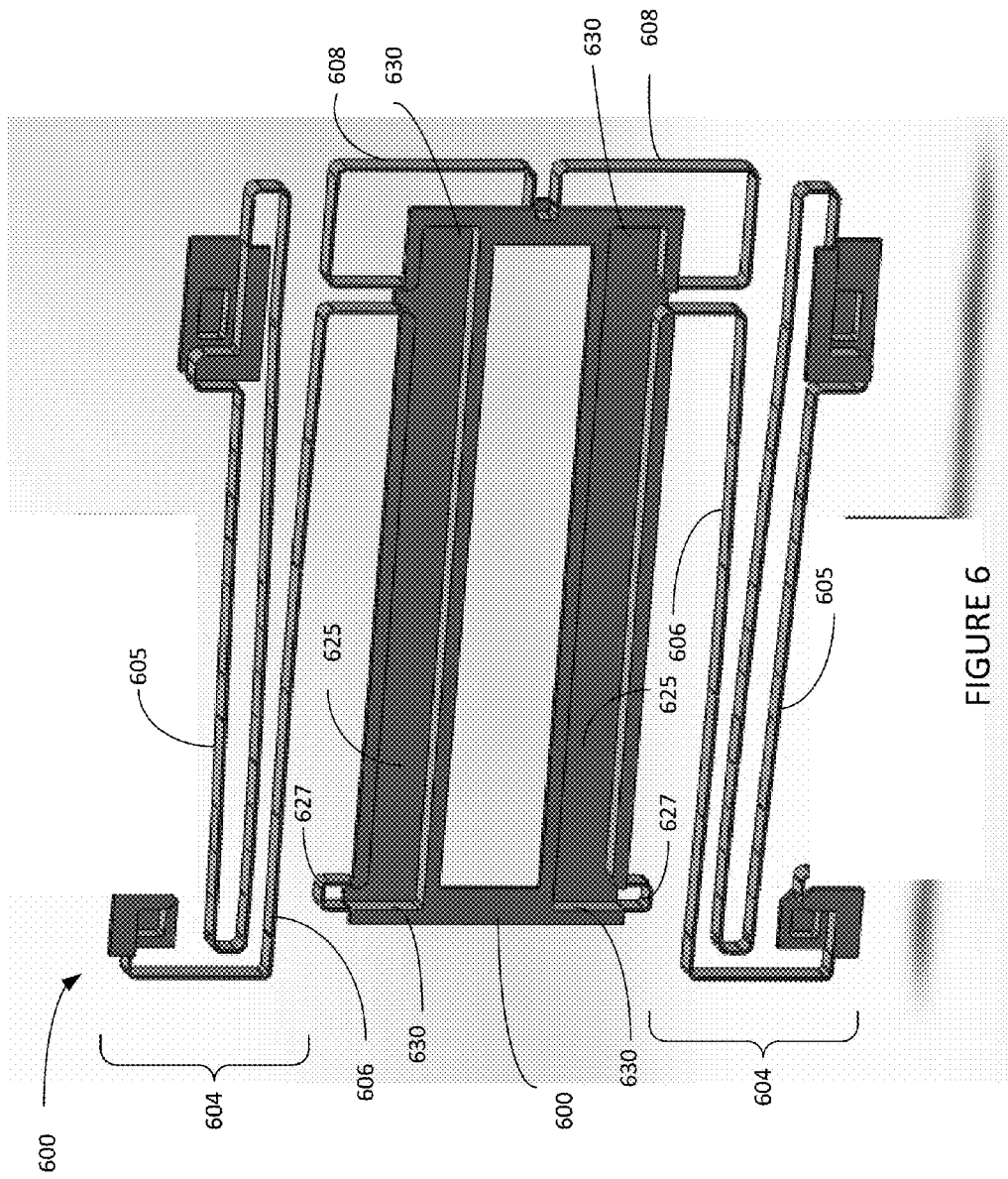
FIG. 6 shows an isometric view of another EMS light modulator.

FIG. 6 shows an isometric view of another EMS light modulator 600. The EMS light modulator 600 is similar to the EMS light modulator 500 shown in FIG. 5. The EMS light modulator 600 includes two actuators 604 and bumpers 627 on either end of a shutter 602 and depressions 625 formed into the shutter 602. Each zipper actuator 604 includes a drive electrode 605, an anchored shutter electrode 606, and a suspended shutter electrode 608. However, the EMS light modulator 600 includes an alternative design for its suspended shutter electrodes 608. Instead of including a shared suspended shutter electrode, such as the shared suspended shutter electrode 508 shown in FIG. 5, the EMS light modulator 600 includes separate suspended shutter electrodes 608 for each zipper actuator 604. The suspended shutter electrodes 608 each couple to the side of the shutter 602 closest to its respective drive electrode 602, as well to the adjacent side of the shutter 602. The two suspended shutter electrodes 608 couple to the adjacent side near the middle of its length between the depressions 625. By coupling to this side of the shutter 602 between the depressions 625, the ends 630 of depressions (along their lengths) in the shutter 602 can be fully closed, similar to the ends 530 of the depressions in the shutter 502, providing an improved display contrast ratio for displays including the EMS light modulator 600.

Figure 7A:
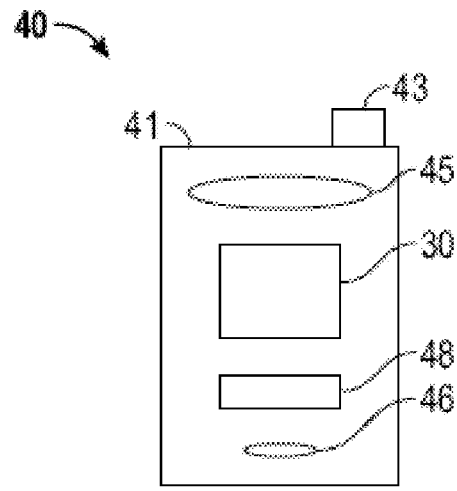
FIGS. 7A and 7B show system block diagrams of an example display device that includes a plurality of display elements.
Figure 7B:
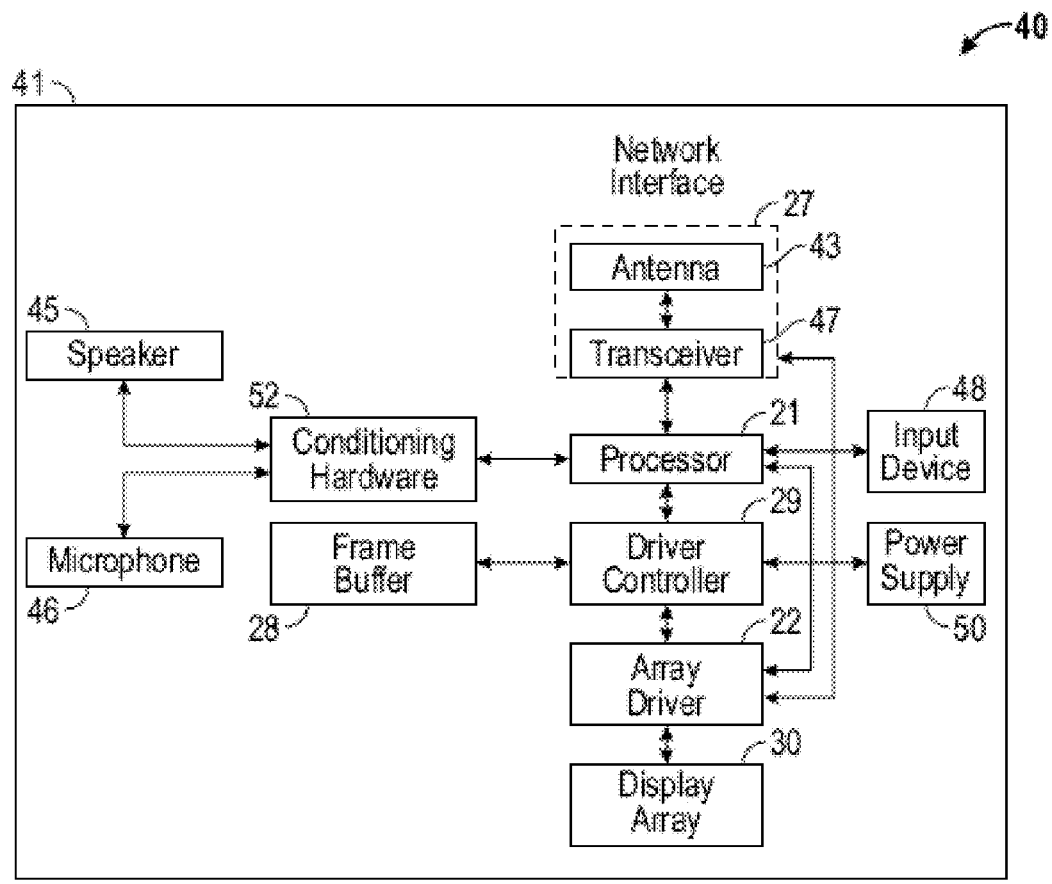

FIGS. 7A and 7B show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be capable of including a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 7B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 7A, can be capable of functioning as a memory device and be capable of communicating with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to any of the IEEE 16.11 standards, or any of the IEEE 802.11 standards. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G, or further implementations thereof, technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29 is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40. Additionally, in some implementations, voice commands can be used for controlling display parameters and settings.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
    an electromechanical systems (EMS) shutter; and
    an EMS actuator including:
        a drive electrode including a parallel plate portion and a zipper portion;
        a shutter electrode including:
            a parallel plate portion coupled to the shutter opposite the parallel plate portion of the drive electrode; and
            a zipper portion coupled to the shutter adjacent to, and separated from, the parallel plate portion of the shutter electrode and positioned opposite to the zipper portion of the drive electrode.

2. The apparatus of claim 1, wherein the parallel plate portion of the shutter electrode includes a portion that is substantially parallel to the parallel plate portion of the drive electrode.

3. The apparatus of claim 1, wherein the shutter further comprises a first edge running substantially normal to an axis of motion of the shutter, and wherein the parallel plate portion and the zipper portion of the shutter electrode extend out towards the drive electrode from the first edge.

4. The apparatus of claim 3, wherein the parallel plate portion of the shutter electrode forms a loop including a portion that is substantially parallel to the first edge of the shutter.

5. The apparatus of claim 3, wherein one end of the parallel plate portion of the shutter electrode couples to the first edge at about a distance away from a first end of the first edge that is between about 8% and about 25% of the distance between the first end of the first edge and a second end of the first edge.

6. The apparatus of claim 4, wherein one end of the parallel plate portion of the shutter electrode couples to the first edge and a second end of the parallel plate portion of the shutter electrode couples to a second edge of the shutter.

7. The apparatus of claim 6, wherein the second edge comprises an edge adjacent to the first edge.

8. The apparatus of claim 6, wherein the second edge comprises an edge opposite the first edge.

9. The apparatus of claim 1, wherein the drive electrode and the zipper portion of the shutter electrode are substantially mechanically compliant and the parallel plate portion of the shutter electrode is substantially less compliant than the zipper portion of the shutter electrode.

10. The apparatus of claim 1, wherein the parallel plate portion of the shutter electrode comprises a suspended shutter electrode and the zipper portion of the shutter electrode comprises an anchored shutter electrode.

11. The apparatus of claim 1, wherein the drive electrode forms a loop.

12. The apparatus of claim 10, wherein the parallel plate portion of the drive electrode is substantially parallel to an edge of the shutter closest to the drive electrode, and the zipper portion of the drive electrode extends out from the parallel plate portion of the drive electrode at an angle towards the edge of the shutter.

13. The apparatus of claim 10, wherein the loop of the drive electrode includes a front portion adjacent the shutter electrode and a rear portion behind the first portion with respect to the shutter electrode, the apparatus further comprising a drive electrode anchor coupling to the rear portion of the drive electrode loop away from either end of the loop.

14. The apparatus of claim 1, further comprising:
    a display including the EMS shutter as a light modulator;
    a processor capable of communicating with the display, the processor being capable of processing image data; and
    a memory device capable of communicating with the processor.

15. The apparatus of claim 13, further comprising:
    a driver circuit capable of sending at least one signal to the display; and
    a controller capable of sending at least a portion of the image data to the driver circuit.

16. The apparatus of claim 13, further comprising:
    an image source module capable of sending the image data to the processor,
    wherein the image source module includes at least one of a receiver, transceiver, and transmitter.

17. An apparatus comprising:
an electromechanical systems (EMS) shutter having a first edge running substantially normal to a direction of motion of the shutter; and
an EMS actuator including:
an anchored shutter electrode coupled at one end to the first edge of the shutter at a first connection point spaced away from a first corner of the first edge and at a second end to a first anchor supporting the shutter over a substrate, wherein the anchored shutter electrode includes a portion that extends out from the first connection point and then alongside the shutter to at least about a second corner of the first edge of the shutter;
a suspended shutter electrode coupled to the shutter between the first connection point and the first corner; and
a drive electrode, coupled to a second anchor positioned proximate to the first corner of the shutter, and including a first portion that extends substantially the entire length of the first edge of the shutter adjacent the anchored shutter electrode and the suspended shutter electrode.

18. The apparatus of claim 17, wherein the suspended shutter electrode forms a loop, including one end that couples to the shutter at a second connection point along the first edge between the first connection point and the first corner and a second end that couples adjacent the first corner.

19. The apparatus of claim 17, wherein the second connection point is spaced away from the first corner by a distance equal to between about 8% and about 25% of the distance between the first corner and the second corner.

20. The apparatus of claim 17, wherein the drive electrode and the anchored shutter electrode are substantially compliant.

21. The apparatus of claim 17, wherein the drive electrode includes a parallel plate portion which is substantially parallel with, and adjacent to, the suspended shutter electrode.

22. The apparatus of claim 21, wherein one end of the parallel plate portion of the drive electrode extends away from the second anchor towards the first corner of the shutter.

23. The apparatus of claim 17, wherein the drive electrode includes a second portion, positioned behind the first portion with respect to the anchored shutter electrode, coupling each end of the first portion of the drive electrode to the second anchor.

24. The apparatus of claim 23, wherein the second portion of the drive electrode extends away from the second anchor both in the direction of the first anchor and in an opposite direction towards the first corner of the shutter.

25. An apparatus comprising:
a mass having a mass zipper electrode coupled to the mass and a mass parallel plate electrode coupled to the mass; and
a drive electrode including a drive zipper electrode portion that is positioned opposite to the mass zipper electrode, and a drive parallel plate electrode portion that is substantially opposite to the mass parallel plate electrode.

26. The apparatus of claim 25, wherein the mass zipper electrode and the mass parallel plate electrode couple to the mass along a common edge of the mass.

27. The apparatus of claim 26, wherein the drive electrode extends substantially the entire length of the common edge of the mass.

28. The apparatus of claim 26, wherein the mass zipper electrode couples to the common edge of the mass at a distance from a corner of the common edge equal to between about 8% and about 25% of the total length of the common edge.

29. The apparatus of claim 25, wherein the mass parallel plate electrode defines a loop.

30. The apparatus of claim 25, wherein the mass comprises a microelectromechanical systems (MEMS) shutter.

* * * * *